United States Patent [19]
Gardner

[11] 3,830,343
[45] Aug. 20, 1974

[54] DISC BRAKE WITH ADJUSTABLE CAM OPERATOR AND THRUST DISTRIBUTER

[75] Inventor: Richard H. Gardner, Pleasant Hill, Ohio

[73] Assignee: The B. F. Goodrich Company, New York, N.Y.

[22] Filed: Dec. 12, 1972

[21] Appl. No.: 314,442

[52] U.S. Cl. ............... 188/71.8, 74/568, 74/571 M, 188/72.7, 188/72.9, 188/217, 192/70.24, 192/111 A
[51] Int. Cl. ......................................... F16d 65/52
[58] Field of Search ....... 188/71.8, 72.6, 72.8, 72.9, 188/196 BA, 204, 217, 72.7; 192/111 A, 70.24, 70.25; 74/568 R, 571 M, 571 R

[56] References Cited
UNITED STATES PATENTS

| | | | |
|---|---|---|---|
| 1,525,568 | 2/1925 | Chapin | 188/196 BA |
| 3,342,290 | 9/1967 | Klaue | 188/72.2 X |
| 3,482,661 | 12/1969 | Meier | 188/71.8 X |
| 3,545,573 | 12/1970 | Barton | 188/72.9 |

FOREIGN PATENTS OR APPLICATIONS

| | | | |
|---|---|---|---|
| 1,201,630 | 9/1965 | Germany | 188/72.9 |
| 1,447,007 | 6/1966 | France | 188/72.6 |

Primary Examiner—George E. A. Halvosa
Attorney, Agent, or Firm—John D. Haney; Frederick K. Lacher

[57] ABSTRACT

A disc brake having a friction lining pad for braking engagement with a rotatable disc. Moving of the friction lining pad is obtained by rotation of a cam engaging a force directing member fastened to the lining pad for transmitting an actuating force to the friction lining pad in a direction for bringing the lining pad into engagement with the disc. Adjustment for wear of the friction lining pad is obtained through the rotation of the cam in the other direction in an amount to maintain engagement with the force directing member in the disengaged condition of the brake to equalize the stroke required to actuate the brake.

4 Claims, 8 Drawing Figures

PATENTED AUG 20 1974 3,830,343

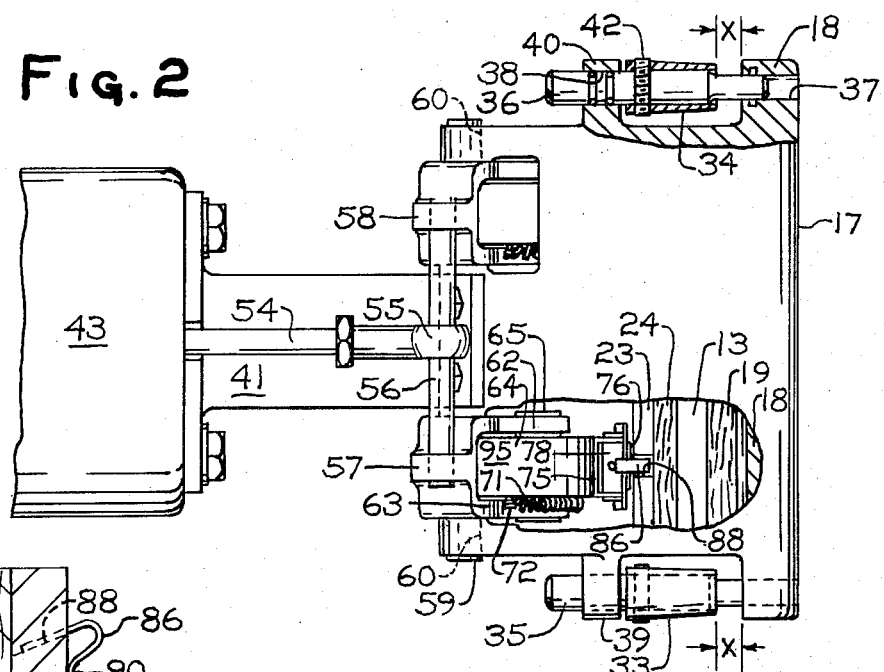
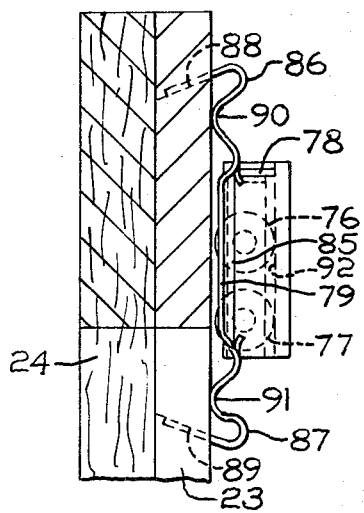
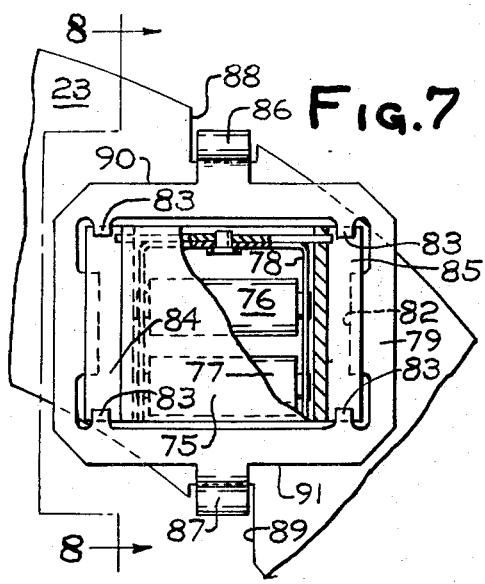
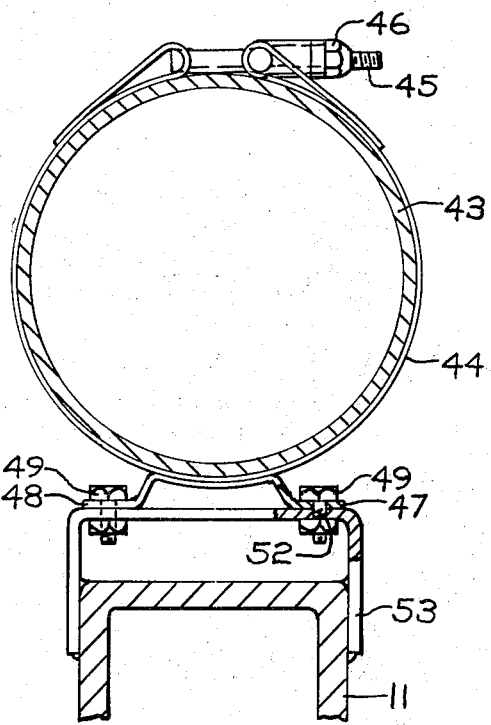

DISC BRAKE WITH ADJUSTABLE CAM OPERATOR AND THRUST DISTRIBUTER

BACKGROUND OF THE INVENTION

This invention relates to a disc brake of the "caliper" type in which one or more pairs of friction lining pads are located on opposite sides of a rotatable disc for movement into braking engagement with the disc. One of the problems of a brake of this type for truck and trailer applications is to compensate for the wear of the friction linings and maintain a constant brake stroke for the proper control of the vehicle by the operator. It is also desirable that some warning be given the operator through lengthening of the brake stroke when the friction lining has been worn down to the point where it should be replaced. The adjustment of the brake for wear should be automatic and maintenance free for the safe economical operation of the brake. Another problem is to apply the braking forces to the friction lining pads in a direction which is substantially perpendicular to the friction lining surface to avoid uneven application of pressure of the lining surface on the brake disc.

SUMMARY OF THE INVENTION

The disc brake of this invention includes a rotatable cam carried by the actuating member. The actuating member urges the friction lining pad into braking engagement with the rotatable disc through the cam. The cam does not rotate when the friction lining pad is in braking engagement with the disc; however, upon movement of the friction lining pad away from the disc the cam is rotatable by a spring to accommodate the wear of the friction lining material. A clutch is provided to prevent rotation during the braking movement and permit rotation during the disengaged condition of the brake. The amount of rotation of the cam is also controlled by the frictional engagement of the cam surface with a force directing member resiliently fastened to the friction lining pad and having rollers in engagement with the lining pad for directing the braking forces in a direction substantially perpendicular to the friction lining surface. The bearing surface of the force directing member provides a predetermined frictional resistance to rotation of the cam for adjustment of the brake.

The outer surface of the cam has an involute shape to compensate for the wear of the friction lining material and maintain a constant stroke. This curve is modified at the position of the cam corresponding to the maximum wear condition of the friction lining so as to increase the stroke and thereby signal the operator of the worn condition of the friction lining pad. The construction of this invention provides for easy removal of the caliper assembly for servicing, lining replacement and disc replacement in a minimum period of time and without removal of the torque plate.

The accompanying drawings show one preferred form of the disc brake made in accordance with and embodying this invention and which is representative of how this invention may be practiced.

BRIEF DESCRIPTION OF THE DRAWINGS

In the drawings:

FIG. 2 is a fragmentary plan view of the disc brake shown in FIG. 1 with parts being broken away.

FIG. 6 is a sectional view taken along the plane of line 6—6 of FIG. 1 showing the mounting of the actuating cylinder on the axle with parts being broken away.

FIG. 7 is an enlarged segmental side view of the friction lining backing plate taken along the plane of line 7—7 of FIG. 1.

FIG. 8 is a sectional view showing the resilient mounting of the rollers taken along the plane of line 8—8 of FIG. 7.

DETAILED DESCRIPTION

Figure 1:
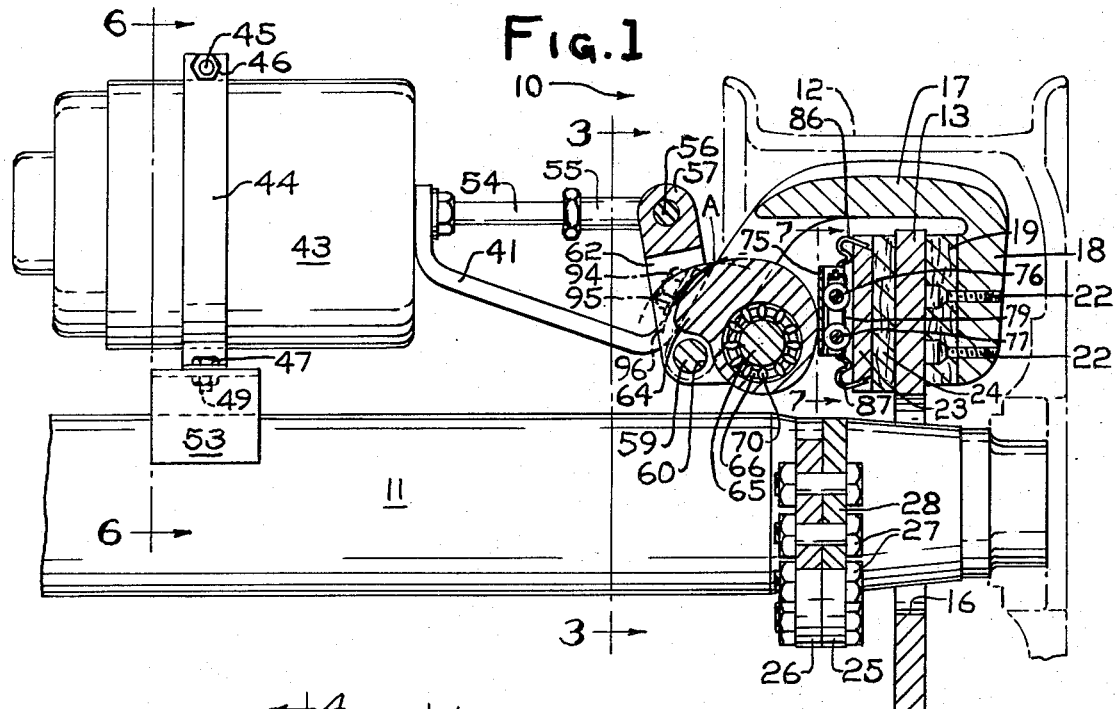
FIG. 1 is a front elevation of a disc brake assembly installed on an axle in braking relation with a wheel, shown in phantom lines, with parts being broken. This view is sectioned along the plane of line 1—1 of FIG. 3.
Figure 4:
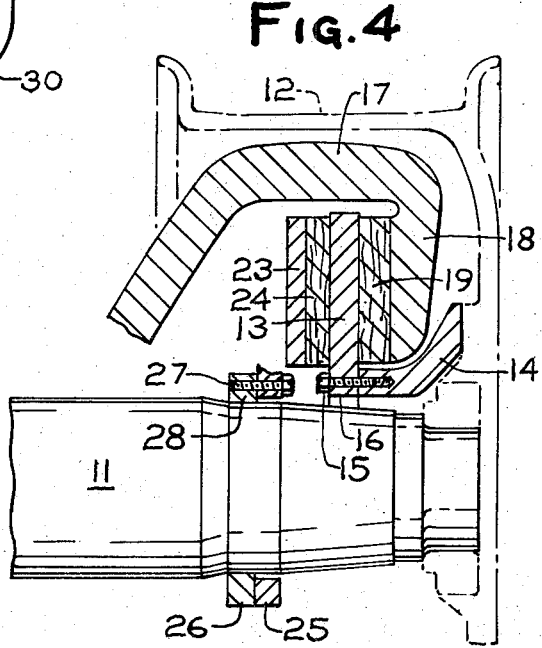
FIG. 4 is a sectional view taken along the plane of line 4—4 of FIG. 3 showing the torque plate and attachment of the rotating disc to the wheel shown in phantom lines.

A disc brake 10 is shown in FIG. 1 for a vehicle having an axle 11 on which a wheel 12, shown in phantom lines in FIGS. 1 and 4, is rotatably mounted. A rotatable brake disc 13, which may be of steel or other wear-resistant material, is carried by the wheel 12 on a bracket 14, shown in FIG. 4. The bracket 14 may be fastened to the wheel 12 as by welding or other suitable means and the disc 13 is removably fastened to the bracket by bolts 15. The brake disc 13 has a central opening 16 through which the axle 11 may extend for supporting the wheel 12.

A floating head or caliper 17 extends around the brake disc 13 and includes a backing plate 18 for one of the friction members at one side of the brake disc. Friction lining 19 for this friction member is removably fastened to the backing plate 18 by screws 22 which are inset to provide for substantial wear of the friction lining face before the heads of the screws are exposed and replacement of the lining is necessary.

On the opposite side of the disc 13 from the first mentioned friction member, another friction member is located having a movable backing plate 23 mounted for movement relative to the caliper 17. The movable backing plate 23 carries a friction lining 24 which may be removably fastened to the backing plate as by screws (not shown).

The backing plate 18 of the caliper 17 and the movable backing plate 23 are supported by a torque plate 25 bolted to a flange 26 which may be welded to the axle 11. Bolts 27 extend through a bolt ring 28 of the torque plate 25 and are threaded in the flange 26 on the axle 11. Supporting arms 29 and 30 extend upwardly and outwardly to supporting sleeves 33 and 34 on opposite sides of the caliper 17 for receiving pins 35 and 36 with the ends slidably mounted in openings 37 and 38 in the caliper backing plate 18 and in brackets 39 and 40. The sleeves 33 and 34 are fastened to the pins 35 and 36 by removable screws 42. The pins 35 and 36 serve as guide means for movement of the backing plate 18 and the movable backing plate 23 which is slidably mounted on the caliper 17 for movement in a direction axially of the brake disc 13. This support also permits the caliper 17 to move in a direction axially of the brake disc 13 for accommodating variations in rotation of the brake disc.

The disc brake 10 is actuated by a cylinder and piston assembly 43, which is of a type well known in the art, and contains a primary air chamber for service use, a secondary air chamber for compressing a spring in the assembly and a spring chamber used for parking and emergency actuation. The cylinder and piston assembly 43 is connected to the caliper 17 by a bracket 41 which may be bolted to the caliper and the cylinder and piston assembly. As shown in FIGS. 1 and 6, the cylinder and piston assembly 43 is held in a strap clamp 44 by an adjusting bolt and nut 45 and 46. The strap clamp 44 has feet 47 and 48 with apertures for receiving bolts 49 which extend through slots 52 in a bracket 53 fastened to the axle 11 as by welding. The slots 52 extend in a direction longitudinally of the axle 11 and permit movement of the cylinder and piston assembly 43 with the caliper 17 relative to the brake disc 13.

A piston rod 54 of the cylinder and piston assembly 43 extends toward the caliper 17 and is connected by a rod eye 55 to actuating rod 56 extending transversely of the brake assembly and pivotally connected to actuating arms 57 and 58. Each of the actuating arms 57 and 58 are bifurcated and shaped like a bell crank. A pivot rod 59 extends through the elbows of the arms 57 and 58 and is fastened to the caliper 17 in openings 60 in the caliper.

Figure 3:
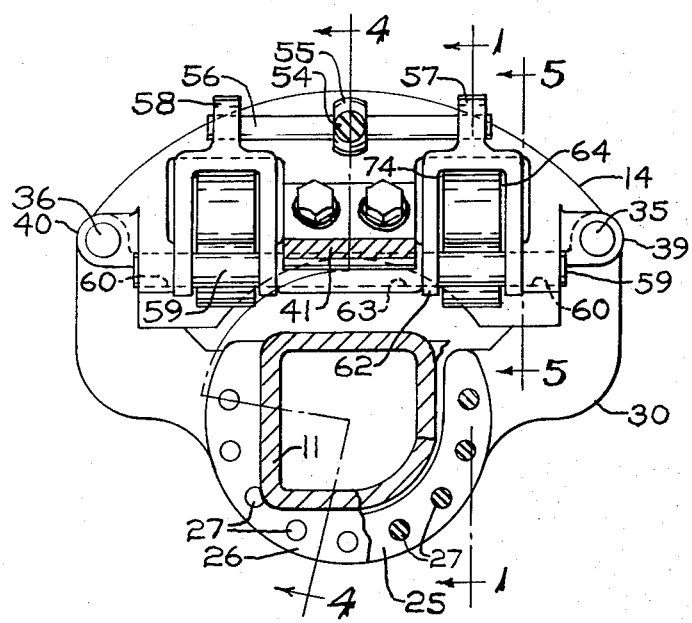
FIG. 3 is a sectional view taken along the plane of line 3—3 of FIG. 1 with parts being broken away.
Figure 5:
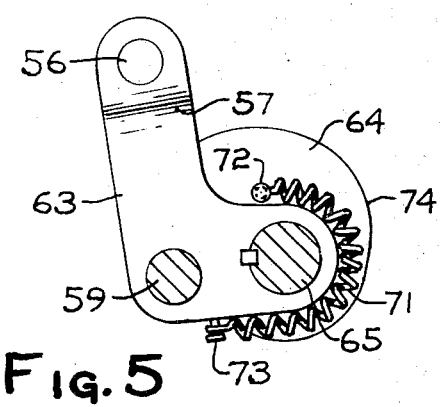
FIG. 5 is an enlarged detailed view of the actuating arm and cam taken along the plane of line 5—5 of FIG. 3.

Because the construction of one of the actuating arms 57 and 58 is identical to the construction of the other of the actuating arms, the following description will be limited to the arm 57 with the understanding that this also applies to the other arm 58. As shown in FIGS. 2 and 3, the actuating arm 57 has spaced-apart legs 62 and 63 with a rotatable cam 64 mounted between the legs for rotation about a stub shaft 65 extending through the legs at the end of the arm 57. The rotatable cam 64 has an annular body with an inner opening 66 for receiving a one-way clutch 70 located between the stub shaft 65 and cam 64 and permitting rotation of the cam in the clockwise direction as shown in FIG. 1 while preventing rotation in the counterclockwise direction. A spring 71 which may be a coil spring extends around the end of the arm 57 and is fastened to the cam 64 by a screw 72 at one end of the spring. At the other end of the spring 71 an eye of the spring is fastened to a screw 73 fastened to the leg 63 of the arm 57 for urging the cam 64 to rotate in the clockwise direction as shown in FIGS. 1 and 5.

The cam 64 has an outer cam surface 74 for movement toward the movable backing plate 23 upon movement of the piston rod 54 to the right, as shown in FIG. 1, and rotation of the arm 57 in the clockwise direction around the pivot rod 59. The outer cam surface 74 contacts a force directing member such as channel 75 in which rollers 76 and 77 are held in a retainer 78 with recesses for receiving shaft axle ends of the rollers. The retainer 78 is fastened to the channel 75 and the channel is held in a surrounding plate spring 79 between underlying flanges 82 and overlying tangs 83 gripping flanges 84 and 85 of the channel. The plate spring 79 has upper and lower "S" shaped flat strip extensions 86 and 87 respectively. The upper flat strip extension 86 extends into an undercut slot 88 in the backing plate 23 and the lower flat strip extension 87 extends into an undercut slot 89 in the backing plate to hold the channel 75 resiliently in place. The upper and lower edges 90 and 91 of the plate spring 79 are inclined toward the backing plate 23 to resiliently space the channel 75 and rollers 76 and 77 away from the backing plate when the force exerted against the channel is less than approximately ten pounds. In the embodiment shown the rollers 76 and 77 are spaced from the surface of the backing plate 0.030 inches. When the pressure exerted by the cam surface 74 is over 10 pounds the rollers 76 and 77 are moved into engagement with the backing plate 23 and inner surface 92 of the channel 75.

The outer cam surface 74 has the shape of an involute curve to maintain the same contact point between the cam surface and the channel 75 and the same stroke of the piston rod 54 as the brake wears and the friction linings 19 and 24 are reduced in thickness. The involute curve of the outer cam surface 74 is indicated by numeral 94 and extends counterclockwise to a position indicated by letter A to the end portion 95 of the outer cam surface. At the end portion 95 in the area of maximum diameter of the cam 64, the outer cam surface 74 deviates from the involute curve indicated by numeral 94 towards a circular curve indicated by numeral 96. As the friction linings 19 and 24 approach the full wear position, the curve of the end portion 95 will permit a gradual increase in stroke of the piston rod 54 and this worn condition will therefore be signaled to the operator by the greater distance the brake pedal must be moved in this condition of the brake 10.

In operation, the brake 10 is actuated by introducing air pressure into the primary air chamber causing the piston rod 54 to move to the right, as shown in FIG. 1, and rotating the arms 57 and 58 about the pivot rod 59. The cam 64 is urged against the channel 75 with the outer cam surface 74 moving in a direction downward and to the right as shown in FIG. 1. The plate spring 79 is deflected and rollers 76 and 77 are brought into engagement with the backing plate 23 and the inner face 92 of the channel 75. The rollers 76 and 77 may roll and the channel 75 may move downwardly so that the direction of the resulting force against the backing plate 23 is substantially perpendicular to the face of the friction lining 24 and the backing plate is not subject to forces tending to move the backing plate upwards or downwards. Accordingly the pressure of the friction lining 24 on the brake disc 13 is evenly distributed. It is understood that more than two rollers 76 and 77 may be incorporated in the channel 75 if desired to further distribute the load.

Reaction between the force of the cam 64 is taken by the pivot rod 59 which transmits force through the caliper 17 to the backing plate 18 and causes equal forces to be applied by each of the friction linings 19 and 24 against the brake disc 13. The sliding support of the caliper 17 on the pins 35 and 36, which are supported in the sleeves 33 and 34 of the torque plate 25, permits movement of the caliper axially of the brake disc 13 for equalizing the pressure of the friction linings 19 and 24 on the brake disc. The mounting of the cylinder and piston assembly 43 on the bracket 53 for sliding movement in the slots 52 also facilitates this movement of the caliper 17 which is attached to the cylinder and piston assembly. In this way, the complete brake assembly 10 is movable and "floats" to accommodate the position of the brake disc 13 and the wear in the friction linings 19 and 24. As shown in FIG. 2, the amount of wear of the friction lining 19 attached to the backing plate 18 is limited by the clearance distance X between the edge of the caliper 17 and the end of the torque plate sleeves 33 and 34.

When the braking pressure exerted by the cylinder and piston assembly 43 on the piston rod 54 is released, the rod will move to the left, as shown in FIG. 1, turning the arms 57 and 58 in the counterclockwise direction and releasing the pressure on the channel 75. The plate spring 79 will urge the channel 75 and rollers 76 and 77 away from the backing plate 23 to the position shown in FIG. 1. If the cam 64 moves further away from the channel 75 it will then be rotated in the clockwise direction by the spring 71 until the cam surface 74 engages the surface of the channel with enough pressure to create frictional resistance to turning of the cam. This rotation provides adjusting movement to compensate for the wear of the friction lining 19 and 24. The force exerted by the spring 71 is only enough to turn the cam 64 when there is little or no friction resistance to the turning of the rollers 75 and 76 and accordingly there is only enough adjusting movement of the cam to take up the wear and there is no force tending to urge the friction linings 19 and 24 into braking engagement with the brake disc 13. In the present construction, no spring is used to keep the friction linings 19 and 24 separated because this is for a low speed application adaptable for trucks or trailers. However, it is contemplated that in a high speed application a spring may be inserted between the backing plates to provide the release clearance.

The caliper 17 can be easily removed for servicing or replacement of the friction linings 19 and 24 by removing the screws 42 from the pins 35 and 36 which may then be slipped out of the openings 37 and 38 in the caliper and out of the sleeves 33 and 34 of the torque plate 25. The piston cylinder assembly 43 may also be easily removed by removing the nut 46 from the strap clamp 44. This provides for replacing the brake disc 13 without removal of the torque plate 25 which may be permanently attached to the axle 11 for economy reasons.

Depending upon the use requirements, one or a number of these caliper assemblies may be used in arcuately spaced positions around the axle 11.

We claim:

1. A disc brake comprising a rotatable brake disc, a friction member located on one side of said disc and having a surface movable into and out of braking engagement with said disc, rotatable cam means engageable with said friction member, actuating means for moving said cam means towards said disc and urging said friction member into braking engagement with said disc, said cam means including an annular body having an outer cam surface with the shape of an involute curve, clutch means between said actuating means and said cam means for limiting rotation of said cam means in a first direction during engagement of said friction member with said disc and permitting rotation of said cam means in a second direction for adjusting movement of said cam means when said friction member is out of engagement with said disc, a force directing member interposed between said outer cam surface and said friction member for engagement by said cam surface whereby the force exerted by said rotatable cam means is directed substantially perpendicular to said surface of said friction member, said force directing member having a roller with a rolling surface for engagement with said friction member and a resilient mounting including a plate spring in resilient engagement with said friction member and having "S" shaped strip extensions extending into slots in said friction member for resiliently holding said force directing member on said friction member and spaced therefrom in an unactuated condition of the brake and said plate spring having sufficient deflection under pressure from said cam means to permit engagement of the rolling surface of said roller with said friction member and said force directing member for rolling movement of said roller on said friction member upon brake actuation.

2. A disc brake comprising a rotatable brake disc, a friction member located on one side of said disc and having a surface movable into and out of braking engagement with said disc, rotatable cam means engageable with said friction member, actuating means for moving said cam means towards said disc and urging said friction member into braking engagement with said disc, said cam means including an annular body having an outer cam surface, clutch means between said actuating means and said cam means for limiting rotation of said cam means in a first direction during engagement of said friction member with said disc and permitting rotation of said cam means in a second direction for adjusting movement of said cam means when said friction member is out of engagement with said disc, a force directing member interposed between said outer cam surface and said friction member for engagement by said cam surface whereby the force exerted by said rotatable cam means is directed substantially perpendicular to said surface of said friction member, said force directing member having a roller with a rolling surface for engagement with said friction member and a resilient mounting including a plate spring in resilient engagement with said friction member and having "S" shaped strip extensions extending into slots in said friction member for resiliently holding said force directing member on said friction member and spaced therefrom in an unactuated condition of the brake and said plate spring having sufficient deflection under pressure from said cam means to permit engagement of the rolling surface of said roller with said friction member and said friction directing member for rolling movement of said roller on said friction member upon brake actuation.

3. A disc brake comprising a rotatable brake disc, a friction member located on one side of said disc and having a surface movable into and out of braking engagement with said disc, rotatable cam means engageable with said friction member, actuating means for moving said cam means towards said disc and urging said friction member into braking engagement with said disc, said cam means including an annular body having an outer cam surface, clutch means between said actuating means and said cam means for limiting rotation of said cam means in a first direction during engagement of said friction member with said disc and permitting rotation of said cam means in a second direction for adjusting movement of said cam means when said friction member is out of engagement with said disc, a force directing member interposed between said outer cam surface and said friction member for engagement by said cam surface whereby the force exerted by said rotatable cam means is directed substantially perpendicular to said surface of said friction member, said force directing member having a roller with a rolling surface for engagement with said friction member, a resilient mounting of said force directing member on said friction member including spring means interposed between said friction member and said force directing member for holding said rolling surface out of engagement with said friction member when no braking pressure is exerted by said cam on said force directing member, said spring means having sufficient deflection under braking pressure from said cam against said force directing member to permit engagement of the rolling surface of said roller with said friction member for rolling movement of said roller on said friction member and sliding movement of said force directing member relative to said friction member.

4. A disc brake comprising a rotatable brake disc, a friction member located on one side of said disc and having a surface movable into and out of braking engagement with said disc, rotatable cam means engageable with said disc friction member, actuating means for moving said cam means towards said disc and urging said friction member into braking engagement with said disc, said cam means including an annular body having an outer cam surface, clutch means between said actuating means and said cam means for limiting rotation of said cam means in a first direction during engagement of said friction member with said disc and permitting rotation of said cam means in a second direction for adjusting movement of said cam means when said friction member is out of engagement with said disc, a force directing member interposed between said outer cam surface and said friction member for engagement by said cam surface whereby the force exerted by said rotatable cam means is directed substantially perpendicularly to said surface of said friction member, said force directing member having a pair of rollers with rolling surfaces for engagement with said friction member, a resilient mounting of said plate member on said friction member including spring means interposed between said friction member and said plate member for holding said rolling surfaces out of engagement with said friction member when no braking pressure is exerted by said cam on said force directing member, said spring means having sufficient deflection under braking pressure from said cam against said force directing member to permit engagement of the rolling surfaces of said rollers with said friction member for rolling movement of said rollers on said friction member and sliding movement of said force directing member relative to said friction member.

* * * * *